(12) United States Patent
Ganesh

(10) Patent No.: US 7,366,492 B1
(45) Date of Patent: Apr. 29, 2008

(54) METHOD AND SYSTEM FOR MOBILE LOCATION DETECTION USING HANDOFF INFORMATION

(75) Inventor: Rajamani Ganesh, Bedford, MA (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 457 days.

(21) Appl. No.: 10/138,273

(22) Filed: May 3, 2002

(51) Int. Cl.
*H04M 11/04* (2006.01)

(52) U.S. Cl. .............................. 455/404.2; 455/456.1; 455/522; 455/442

(58) Field of Classification Search ............. 455/432.1, 455/436, 442, 456.1–456.6, 516–517, 521, 455/524, 404.1, 404.2, 522; 342/457
See application file for complete search history.

(56) References Cited

U.S. PATENT DOCUMENTS

| | | | |
|---|---|---|---|
| 4,445,118 A | 4/1984 | Taylor et al. |
| 4,651,157 A | 3/1987 | Gray et al. |
| 4,654,867 A | 3/1987 | Labedz et al. |
| 4,737,978 A | 4/1988 | Burke et al. |
| 4,748,655 A | 5/1988 | Thrower et al. |
| 4,750,197 A | 6/1988 | Denekamp et al. |
| 4,754,465 A | 6/1988 | Trimble |
| 4,809,005 A | 2/1989 | Counselman, III |
| 4,912,756 A | 3/1990 | Hop |
| 5,014,206 A | 5/1991 | Scribner et al. |
| 5,043,736 A | 8/1991 | Darnell et al. |
| 5,055,851 A | 10/1991 | Sheffer |
| 5,081,703 A | 1/1992 | Lee |
| 5,095,500 A | 3/1992 | Tayloe et al. |
| 5,155,689 A | 10/1992 | Wortham |
| 5,208,756 A | 5/1993 | Song |
| 5,218,367 A | 6/1993 | Sheffer et al. |
| 5,221,925 A | 6/1993 | Cross |
| 5,235,633 A | 8/1993 | Dennison et al. |
| 5,293,645 A | 3/1994 | Sood |
| 5,299,132 A | 3/1994 | Wortham |
| 5,327,144 A | 7/1994 | Stilp et al. |
| 5,371,781 A | 12/1994 | Ardon |

(Continued)

FOREIGN PATENT DOCUMENTS

CA 2122988 5/1993

(Continued)

OTHER PUBLICATIONS

"GPS-Based Vessel Position Monitoring and Display System", IEEE 1990 Position Location and Navigation Symposium, Mar. 20, 1990.

(Continued)

*Primary Examiner*—Duc M. Nguyen
*Assistant Examiner*—Anthony S. Addy

(57) ABSTRACT

Methods and systems for mobile station location detection. A mobile station measures signal strength of each of a set of signals associated with the mobile station, then determines whether a number of signals in the set is less than a predetermined threshold. Based on the determination, the mobile station calculates a difference in power between a first and second signal associated with the mobile station. Thereafter, power on a channel corresponding to the mobile station is increased for a predetermined number of frames based on the calculation. The location of the mobile station is determined during the power increase.

33 Claims, 5 Drawing Sheets

U.S. PATENT DOCUMENTS

| | | | |
|---|---|---|---|
| 5,388,147 A | 2/1995 | Grimes | |
| 5,398,190 A | 3/1995 | Wortham | |
| 5,432,841 A | 7/1995 | Rimer | |
| 5,442,684 A | 8/1995 | Hashimoto et al. | |
| 5,479,482 A | 12/1995 | Grimes | |
| 5,508,708 A | 4/1996 | Ghosh et al. | 342/457 |
| 5,519,621 A | 5/1996 | Wortham | |
| 5,519,760 A | 5/1996 | Borkowski et al. | |
| 5,542,100 A | 7/1996 | Hatakeyama | |
| 5,544,225 A | 8/1996 | Kennedy, III et al. | |
| 5,548,583 A | 8/1996 | Bustamante | |
| 5,561,704 A | 10/1996 | Salimando | |
| 5,561,840 A | 10/1996 | Alvesalo et al. | |
| 5,577,022 A * | 11/1996 | Padovani et al. | 370/332 |
| 5,614,914 A | 3/1997 | Bolgiano et al. | 342/364 |
| 5,663,990 A | 9/1997 | Bolgiano et al. | 375/347 |
| 5,736,964 A | 4/1998 | Ghosh et al. | 342/457 |
| 5,764,188 A | 6/1998 | Ghosh et al. | 342/457 |
| 5,815,814 A | 9/1998 | Dennison et al. | |
| RE35,916 E | 10/1998 | Dennison et al. | |
| 5,859,879 A | 1/1999 | Bolgiano et al. | 375/347 |
| 5,878,038 A | 3/1999 | Willey | 370/335 |
| 5,920,549 A * | 7/1999 | Bruckert et al. | 370/331 |
| 5,943,014 A * | 8/1999 | Gilhousen | 342/465 |
| 5,945,948 A * | 8/1999 | Buford et al. | 342/457 |
| 6,005,854 A | 12/1999 | Xu et al. | 370/335 |
| 6,018,662 A | 1/2000 | Periyalwar et al. | 455/442 |
| 6,061,337 A | 5/2000 | Light et al. | 370/331 |
| 6,081,229 A | 6/2000 | Soliman et al. | 342/357.05 |
| 6,097,954 A | 8/2000 | Kumar et al. | 455/442 |
| 6,118,767 A | 9/2000 | Shen et al. | 370/252 |
| 6,292,671 B1 | 9/2001 | Mansour | 455/518 |
| 6,321,089 B1 | 11/2001 | Han | 455/438 |
| 6,337,983 B1 | 1/2002 | Bonta et al. | 455/437 |
| 6,351,642 B1 * | 2/2002 | Corbett et al. | 455/442 |
| 6,421,009 B2 * | 7/2002 | Suprunov | 342/465 |
| RE38,267 E | 10/2003 | Borkowski et al. | |
| 6,928,066 B1 * | 8/2005 | Moon et al. | 370/342 |
| 6,963,755 B2 * | 11/2005 | Chen et al. | 455/522 |
| 6,972,717 B2 * | 12/2005 | Sollenberger et al. | 342/387 |
| 2002/0082037 A1 * | 6/2002 | Salonaho et al. | 455/522 |

FOREIGN PATENT DOCUMENTS

| | | |
|---|---|---|
| CA | 2069230 | 11/1993 |
| CA | 2149135 | 5/1994 |
| CA | 2139514 | 12/1994 |
| CA | 2161333 | 5/1998 |
| EP | 0484067 | 5/1992 |
| WO | 89/12835 | 12/1989 |
| WO | 94/01978 | 1/1994 |

OTHER PUBLICATIONS

Trimble Data Sheet dated May 1989 disclosing hand held GPS Receiver Sold by Trimble Navigation under the name "Trimpack".
Bellcore Technical Advisory, TA-NPL-000145, Compatibility Information of a Wireless Service Provider and Local Exchange Carrier Network.

* cited by examiner

METHOD AND SYSTEM FOR MOBILE LOCATION DETECTION USING HANDOFF INFORMATION

RELATED APPLICATIONS

The following identified U.S. patent applications are relied upon and are incorporated by reference in this application.

U.S. patent application No. 09/080,270, entitled "CELLULAR NETWORK-BASED LOCATION SYSTEM," filed May 18, 1998, which is a Reissue Application of U.S. Pat. No. 5,519,760.

U.S. patent application No. 09/969,637, entitled "CELLULAR NETWORK-BASED LOCATION SYSTEM," filed Oct. 4, 2001, which is a continuation of U.S. patent application No. 09/080,270, filed May 18, 1998, which is a Reissue Application of U.S. Pat. No. 5,519,760.

FIELD OF THE INVENTION

The present invention relates generally to data processing systems and, more particularly, to a method and system for facilitating mobile location detection using handoff information.

DESCRIPTION OF RELATED ART

The Federal Communications Commission (FCC) requires all wireless service providers or carriers using network-based technologies to provide the location of a mobile handset seeking emergency services with an accuracy of 100 meters 67% of the time and 300 meters 95% of the time. For all wireless service providers using handset-based technologies, the location has to be provided with an accuracy of 50 meters 67% of the time and 150 meters 95% of the time. These requirements are part of the so-called E-911 phase 2 mandate.

Wireless carriers typically use a wireless caller location system and a mobile positioning center (MPC) to attempt to meet the FCC requirements. Most network-based wireless caller location technologies are based on an overlay model. Location measuring units (LMU) may be located at wireless base stations, and under control from a central location processor, measure features of wireless handsets' reverse link radio signals. The LMU's transmit these measurements to a position determining equipment (PDE) where the location of the handset is determined using time difference of arrival (TDOA) and/or angle of arrival (AOA) techniques, and communicated to end user applications. The MPC serves as the point of interface to the wireless network for the retrieval, forwarding, storage, and position control of location data. The MPC translates location data into usable information for public safety answering points (PSAP's) to successfully interface with wireless carriers and caller location systems.

The TDOA technique uses the difference in arrival times of a mobile handset's radio signal at three or more separate cell sites to determine the location. The AOA technique uses the direction of arrival of a handset's signal using calibrated antenna arrays mounted at multiple sites to determine the location of the handset. In some applications, both techniques are used in combination to yield more accurate locations.

The combination of TDOA and AOA sensors can often be used to meet the requirements of the E-911 phase 2 mandate. But in some scenarios the distance between the mobile handset and a base station may become very small, causing the mobile handset to reduce its transmit power appropriately to minimize the interference it causes in the network. This reduction in transmit power may make it difficult for the LMU's to accurately receive and measure the required features from the handset's reverse link channels, resulting in an inaccurate location determination.

SUMMARY OF THE INVENTION

Methods and systems consistent with the principles of the invention facilitate mobile station location detection. A mobile station measures signal strength of each of a set of signals associated with the mobile station, then determines whether a number of signals in the set is less than a predetermined threshold. Based on the determination, the mobile station calculates a difference in power between a first and second signal associated with the mobile station. Thereafter, power on a channel corresponding to the mobile station is increased for a predetermined number of frames based on the calculation. The location of the mobile station is determined during the power increase.

Other methods and systems consistent with the principles of the invention also facilitate mobile station location detection. An emergency services call is initiated from a mobile station. The mobile station measures signal strength of each of a set of signals associated with the call, then determines whether a number of signals in the set is less than a predetermined threshold based on a handoff status of the mobile station. Based on the determination, the mobile station calculates a difference in power between a first and second signal associated with the call. Thereafter, power on a channel corresponding to the mobile station is increased for a predetermined number of frames based on the calculation. The location of the mobile station is determined during the power increase.

Other methods and systems consistent with the principles of the invention also facilitate mobile station location detection. An emergency services call is initiated from a mobile station. The mobile station measures signal strength of each of a set of signals associated with the call, then determines whether a number of signals in the set is less than a predetermined threshold based on a handoff status of the call. Based on the determination, the mobile station calculates a difference in power between a first and second signal associated with the call. Thereafter, power on a channel corresponding to the mobile station is increased for a predetermined number of frames based on the calculation. During the power increase, the location of the mobile station is determined using a technique based on a difference in arrival time of a signal from the mobile station at separate base stations.

Other methods and systems consistent with the principles of the invention also facilitate mobile station location detection. An emergency services call is initiated from a mobile station. The mobile station measures signal strength of each of a set of signals associated with the call, then determines whether a number of signals in the set is less than a predetermined threshold based on a handoff status of the call. Based on the determination, the mobile station calculates a difference in power between a first and second signal associated with the call. Thereafter, power on a channel corresponding to the mobile station is increased for a predetermined number of frames based on the calculation. During the power increase, the location of the mobile station is determined using a technique based on a direction of arrival of a signal from the mobile station at multiple base stations.

BRIEF DESCRIPTION OF THE DRAWINGS

The accompanying drawings are incorporated in and constitute a part of this specification and, together with the description, explain the features and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the principles of the invention enable improved mobile station location detection. A mobile station initiates an emergency services call. The mobile station may then monitor the pilot signals associated with it and determine it present handoff status. The mobile station also measures signal strength of each pilot in its candidate set of pilots (the mobile station is also capable of measuring and reporting signal strengths of each pilot in its active set or neighbor set). The mobile station further determines whether a number of signals in the candidate set is less than a predetermined threshold that differs dependent on the handoff status of the mobile station. The handoff status of the mobile station may typically be determined by the number of pilots in its active set. The mobile station calculates a difference in power between a first and second signal associated with the mobile station. The first and second signal differ dependent on the handoff status of the mobile station and whether the number of pilots in the candidate set is less than the threshold. Thereafter, the power on the reverse traffic channel of the mobile station is increased for a predetermined number of frames. The power increase makes it possible for more location measuring units to detect transmission from the mobile station, and thus results in a more accurate location determination by the position determining equipment.

Network Environment

Figure 1:
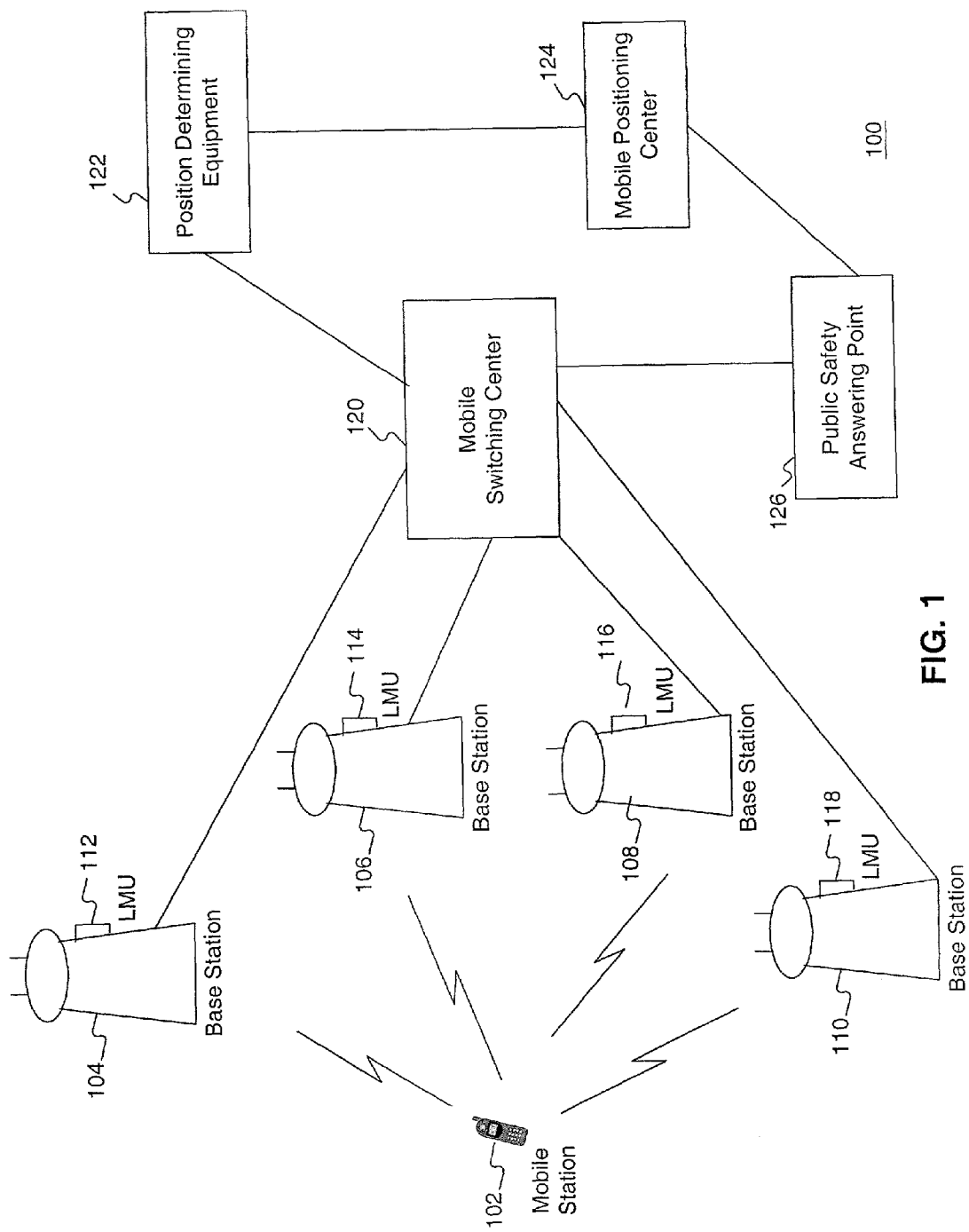
FIG. 1 is a diagram of an exemplary network environment in which features and aspects consistent with the present invention may be implemented.

FIG. 1 is a diagram of an exemplary network environment in which features and aspects consistent with the present invention may be implemented. Network environment 100 comprises mobile station 102, a number of base stations 104-110, a number of location measuring units (LMU's) 112-118, mobile switching center 120, position determining equipment 122, mobile positioning center 124, and public safety answering point 126. However, the number of components in network environment 100 is not limited to what is shown.

Mobile station 102 may be a mobile handset such as a cellular or PCS (personal communications services) telephone or other communications device capable of wireless communication. In one embodiment mobile station 102 may be a CDMA (Code Division Multiple Access) handset such as a Nokia 3285, Motorola V120c, Samsung SCH-N300, Kyocera QCP6035, Sanyo SCP6200, or any other handset or mobile apparatus that operates in accordance with CDMA networks. Mobile station 102 may or may include a GPS (global positioning system) receiver, which is operable to determine the location of mobile station 102. An exemplary CDMA mobile station with a GPS receiver is the Kyocera 2325 handset.

Base stations 104-110 provide radio communication for mobile station 102 and other mobile stations (not shown). Each base station includes a processor that is operable to send at least a command to mobile station 102 to increase or decrease power on the reverse traffic channel. A reverse traffic channel refers to a channel that carries the flow of traffic from a mobile station to a base station. So an increase in power on the reverse traffic channel is an increase in transmitting power from a mobile station to a base station. The channel that carries the flow of traffic from a base station to a mobile station is known as the forward traffic channel.

Location measuring units (LMU) 112-118 may be co-located at base stations 104-110, respectively. A LMU, under control from a processor such as the processor from a base station, may measure various features of a mobile station's reverse channels (e.g., including reverse traffic channel, reverse access channel, and/or any other reverse channels). These features may include, for example, arrival times of a mobile station's signal, a direction of arrival of a mobile station's signal, strength of a mobile station's signal, and so on. The LMU may transmit there measurements to a position determining equipment, such as position determining equipment 122, via mobile switching center 120. Position determining equipment 122 may subsequently determine the location of the mobile unit using TDOA techniques and/or AOA techniques, then send the location to public safety answering point 126 via mobile positioning center 124. One skilled in the art will recognize that other location determining techniques may also be used.

Mobile switching center 120 may be a mobile telephone network switch that provides processing and switching functions to allow mobile phones (and other mobile stations) to communicate with other phones or stations (mobile and wireline). In one embodiment, mobile switching center 120 may include at least one processor and at least one mobile switch.

Mobile positioning center 124 serves as the point of interface to the wireless network for the retrieval, forwarding, storage and position control of location data. Mobile positioning center 124 may translate location data from positioning determining equipment 122 into usable information for public safety answering point 126.

Public safety answering point 126 may communicate with mobile station 102 via mobile switching center 120. Public safety answering point 126 also receives translated location data from mobile positioning center 124 and displays geographical position information of a mobile station that is seeking emergency services or other services requiring the location of the mobile station to be determined. For example, public safety answering point 126 may be an entity receiving a voice channel over a mobile link connected to mobile switching center 120, and receiving geographical location data from mobile positioning center 124. Public safety answering point 126 may include a processing center with dispatching and/or storage capabilities that receives user calls and location data and provides services based upon that information. A dispatcher at public safety answering point 126 may be provided with equipment to talk or otherwise communicate with a mobile station caller and display the caller's position on a graphical display. More particularly, public safety answering point 126 may overlay received latitude and longitude information onto a geographical map to determine specific address information (e.g., street/highway/etc.) for use by emergency personnel.

In one embodiment, network 100 is part of a CDMA network. In a CDMA network that compiles with current standard IS-95, for example, the forward CDMA channel includes a point channel, a sync channel, up to seven paging channels, and up to sixty-three forward traffic channels. Each of these channels may be orthogonally spread by an appropriate Walsh function (contains 64 unique 64-bit codes) and then spread by the quadrature pair of PN (pseudo-noise) sequences at a fixed rate.

The pilot channel is used for synchronization by a mobile station operating within the coverage area of a sector, and is transmitted at all times by the sector on each active forward CDMA channel. Each sector of a cell site is assigned a specific time or phase offset of the pilot PN sequence to identify a forward CDMA channel. The same pilot PN sequence offset is used on all CDMA frequency assignments for a given sector of a cell site. For example, all traffic channels, sync and paging channels transmitted from a single sector share the same PN offset. Distinct pilot channels are identified by an offset index (0 through 511 inclusive). This offset index specifies the offset value from the zero offset pilot PN sequence. Each offset increment represents the interval between pilots, in increment of 64 chips (e.g., 52.08 ms).

Each base station typically transmits a pilot that identifies the base station and is used to indicate the signal strength available from that base station. A mobile station may detect these pilots and measure the associated signal strength. Based on the measured signal strengths, the mobile station maintains different sets of pilots. An active mobile station (e.g., a mobile station engaged in communication) maintains four sets of pilots when communicating with a CDMA sector. Namely, the active set, the candidate set, the neighbor set, and the remaining set. The active set includes the pilots that the mobile station is currently using for demodulation. The candidate set includes the pilots that are not currently in the active set but have sufficient signal strength to be considered for soft or softer handoff. The neighbor set includes the pilots that are not currently in the active or candidate set, but which may become eligible for handoff (e.g., nearby sites). The remaining set is the set of all possible assigned pilots in the CDMA network (on the same carrier frequency) excluding the pilots defined in the other three sets.

At least four LMU's are typically used to provide positioning determining equipment 122 with measurements to determine an accurate mobile station location. This is similar to global positioning system (GPS) geometry, where a GPS receiver needs to pick up the transmissions of at least four satellites in order to provide the latitude, longitude, and altitude (or other similar measurement) of its current position.

Sometimes the distance between a mobile station and a base station becomes small enough to cause the mobile station to reduce its transmit power to minimize interference. This reduction in transmit power may make it difficult for enough LMU's to accurately receive and measure the required features of the mobile's reverse link channels. The LMU's usually require a mobile signal strength above a threshold to report an accurate measurement to the position determining equipment 122.

Because too few LMU's may report their measurements when transmit power is decreased, an accurate location fix for the mobile station seeking emergency services cannot be determined. Systems and methods consistent with the present invention may temporarily increase the transmit power of a mobile station in order to determine an accurate location of the mobile station.

Figure 2:
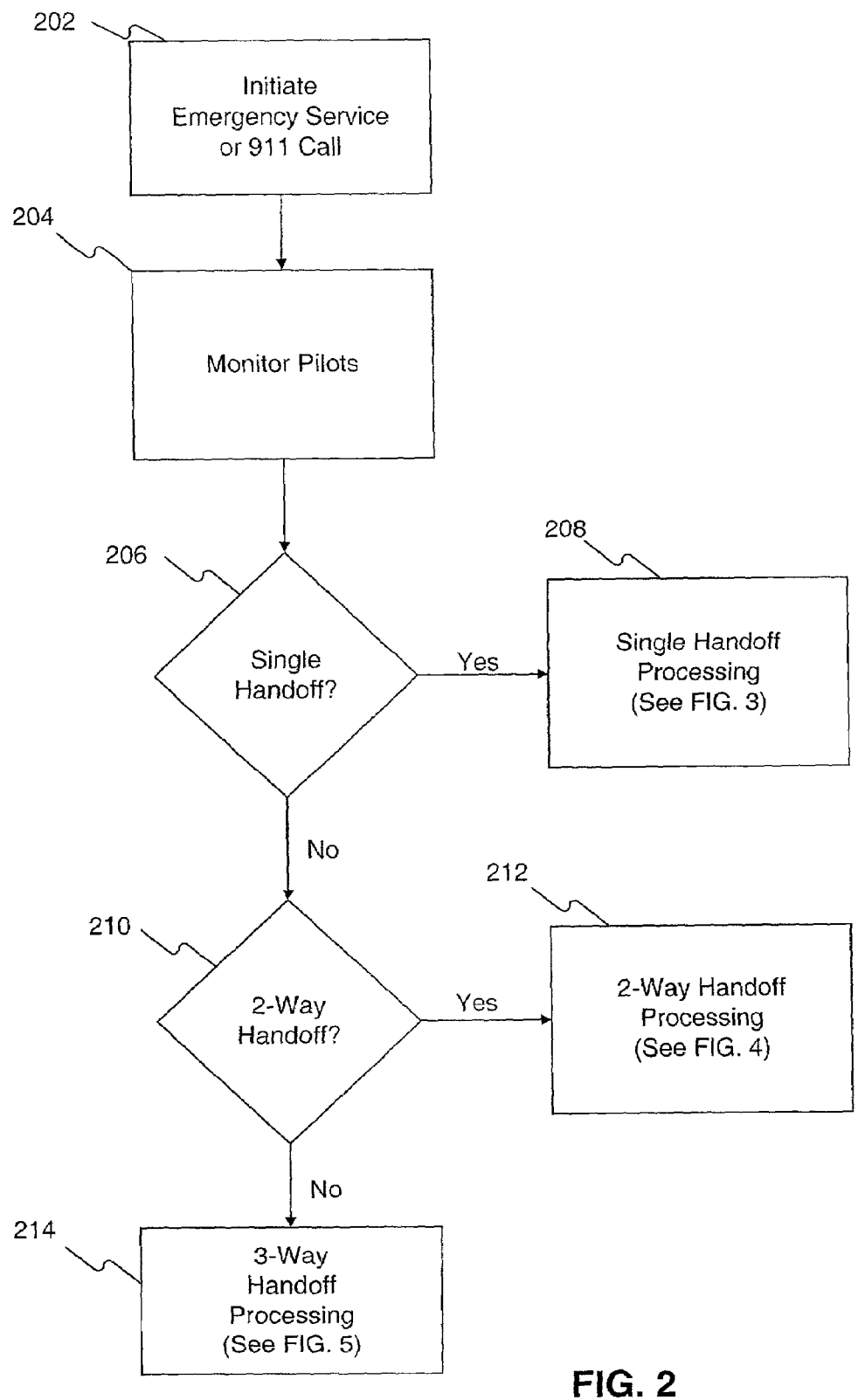
FIG. 2 is a diagram an exemplary flowchart of a method for mobile location detection in a manner consistent with the present invention.

FIG. 2 is an exemplary flowchart of a method for mobile location detection in a manner consistent with the present invention. Although the steps of the flow chart are described in a particular order, one skilled in the art will appreciate that these steps may be performed in a different order, or that some of these steps may be concurrent.

A mobile station, such as mobile station 102 initiates an emergency service or 911 call, or other call where a location of the mobile station is determined (step 202). When the call is an emergency service or 911 call, a processor in the mobile station starts to monitor the pilots associated with the call (step 204). The mobile station also notes its handoff status. For example, the mobile station may determine whether or not it is involved in a single handoff (step 206). If there is a single handoff, then the mobile station may proceed to perform single handoff processing (step 208). If the mobile station is not involved in a single handoff, the mobile station may determine whether it is involved in a 2-way soft or softer handoff (step 210). If there is a 2-way soft or softer handoff, the mobile station may proceed to perform 2-way handoff processing (step 212). Otherwise, when the mobile station is in a 3-way soft or softer handoff mode, the mobile station performs 3-way handoff processing (step 214). Typically, if a mobile station has one pilot in the active set, then its handoff status is single handoff. If a mobile station has two pilots in the active set, then its handoff status is 2-way soft or softer handoff. And if a mobile station has three pilots in the active set, then its handoff status is 3-way soft or softer handoff.

Figure 3:
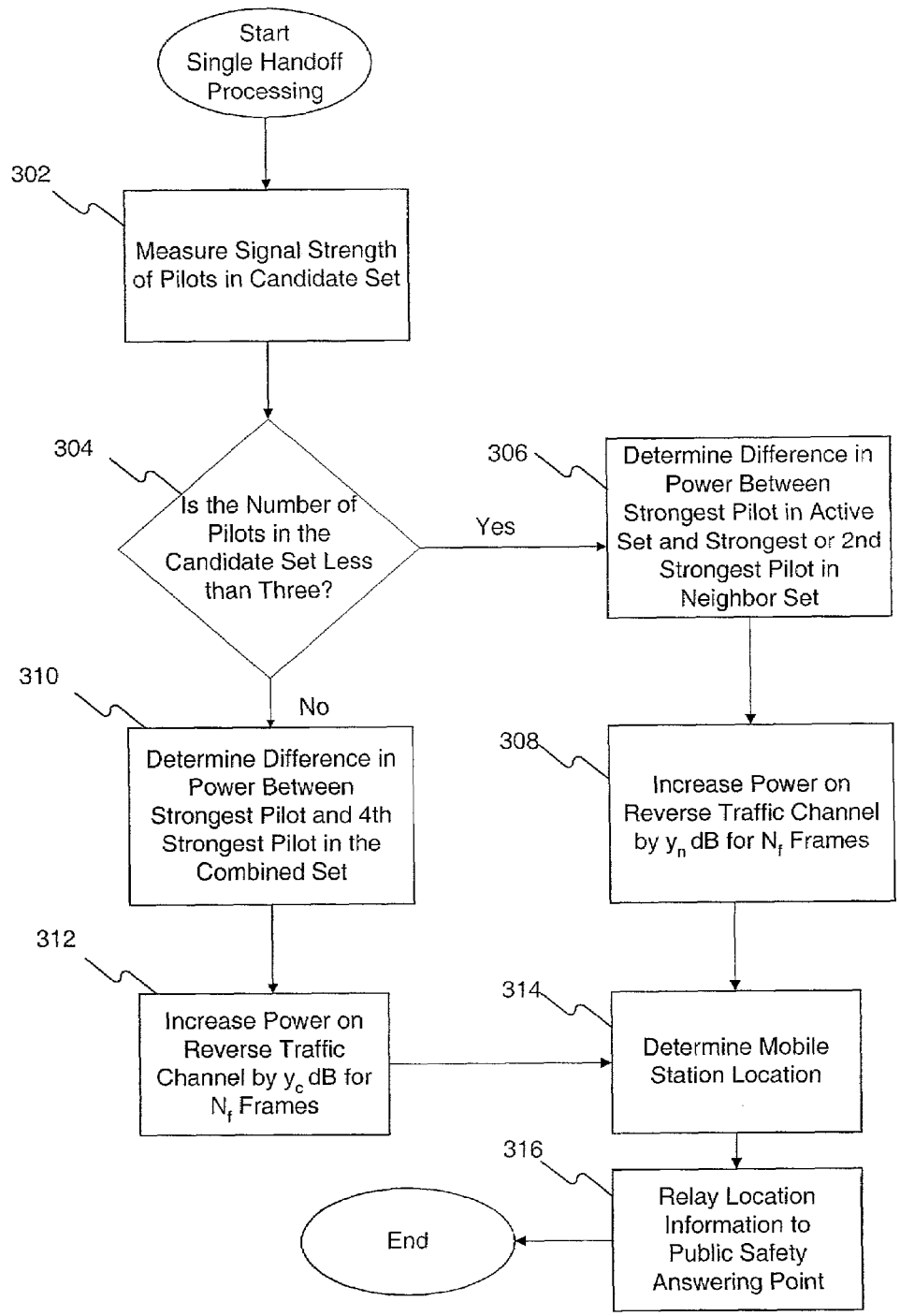
FIG. 3 is a diagram an exemplary flowchart of a method for mobile location detection during single handoff in a manner consistent with the present invention.

FIG. 3 is an exemplary flowchart of a method for mobile location detection during single handoff in a manner consistent with the present invention. Although the steps of the flow chart are described in a particular order, one skilled in the art will appreciate that these steps may be performed in a different order, or that some of these steps may be concurrent. First, the mobile station measures the signal strength of the pilots in the candidate set (step 302). Next, the mobile station determines whether the number of pilots in the candidate set is less than three (step 304).

If there are less than three pilots in the candidate set, then the mobile station determines the difference in power between the strongest pilot in the active set and the strongest or second strongest pilot in the neighbor set, and sets this difference as $y_n$ (step 306). Because this is the single handoff case, there is only one pilot in the active set, and that pilot is therefore the strongest in the active set. Whether the mobile station should use the strongest or second strongest pilot in the neighbor set to determine the power difference depends on the number of pilots in the candidate set. When there are two pilots in the candidate set, the mobile station uses the strongest pilot in the neighbor set. When there is one pilot in the candidate set, the mobile station uses the second strongest pilot in the neighbor set.

In response to a command from a base station, the mobile station increases power on the reverse traffic channel by $y_a$ dB for a predetermined number ($N_f$) of frames (step 308). In one embodiment $N_f$ may be a performance parameter decided by a network administrator, network performance engineer, or other user. Factors used to determine $N_f$ may include, for example, the call setup time and the speech time (e.g., duration of speech) in one frame. One way to determine $N_f$ is to start with a low number of frames (e.g., 3-5 frames) and gradually increase the number of frames until the number is suitable for improving location detection consistent with the invention. The value of $N_f$ should be small enough such that a base station does not start issuing power control messages to the mobile station to reduce transmit power. In an alternative embodiment, instead of setting $N_f$ to a value small enough that a base station does not have time to command a power decrease, the mobile station may be programmed such that it ignores any additional power control messages for the next $N_f$ frames (or the base station may be programmed to not issue power control messages to the mobile station for the next $N_f$ frames). The mobile station could then decrease its transmit power appropriately by either $y_n$ dB or $y_c$ dB after $N_f$ frames (depending on by how much the power was previously increased). The value $y_c$ is defined below in connection with steps 310 and 312.

Once the power on the reverse traffic channel has been increased, position determining equipment 122 may determine the location of the mobile station (step 314). Thereafter, position determining equipment 122 relays location information to public safety answering point 126 via mobile positioning center 124 (step 316).

When there are three or more pilots in the candidate set, the mobile station determines the difference in power between the strongest pilot and the fourth strongest pilot in the combined active and candidate sets, and sets this difference as $y_c$ (step 310). In other words, the mobile station determines the power difference between the only pilot in the active set and the third strongest pilot in the candidate set. In response to a command from a base station, the mobile station increases power on the reverse traffic channel by $y_c$ dB for a predetermined number ($N_f$) of frames (step 312).

Once the power on the reverse traffic channel has been increased, position determining equipment 122 may determine the location of the mobile station (step 314). Thereafter, position determining equipment 122 relays location information to public safety answering point 126 via mobile positioning center 124 (step 316).

As a result of the power on the reverse traffic channel increasing, whether it be by $y_n$ dB or $y_c$ dB, more LMU's are able to "hear" the transmission from the mobile station. Specifically, increasing the power in this manner may temporarily increase the number of pilots in the active set. This results in a more accurate location determine by the positioning determining equipment. Typically, $y_n > y_c$ because neighbor set pilots are usually weaker than candidate set pilots, and thus less of a power boost is needed when the number of pilots in the candidate set is above a certain threshold.

Figure 4:
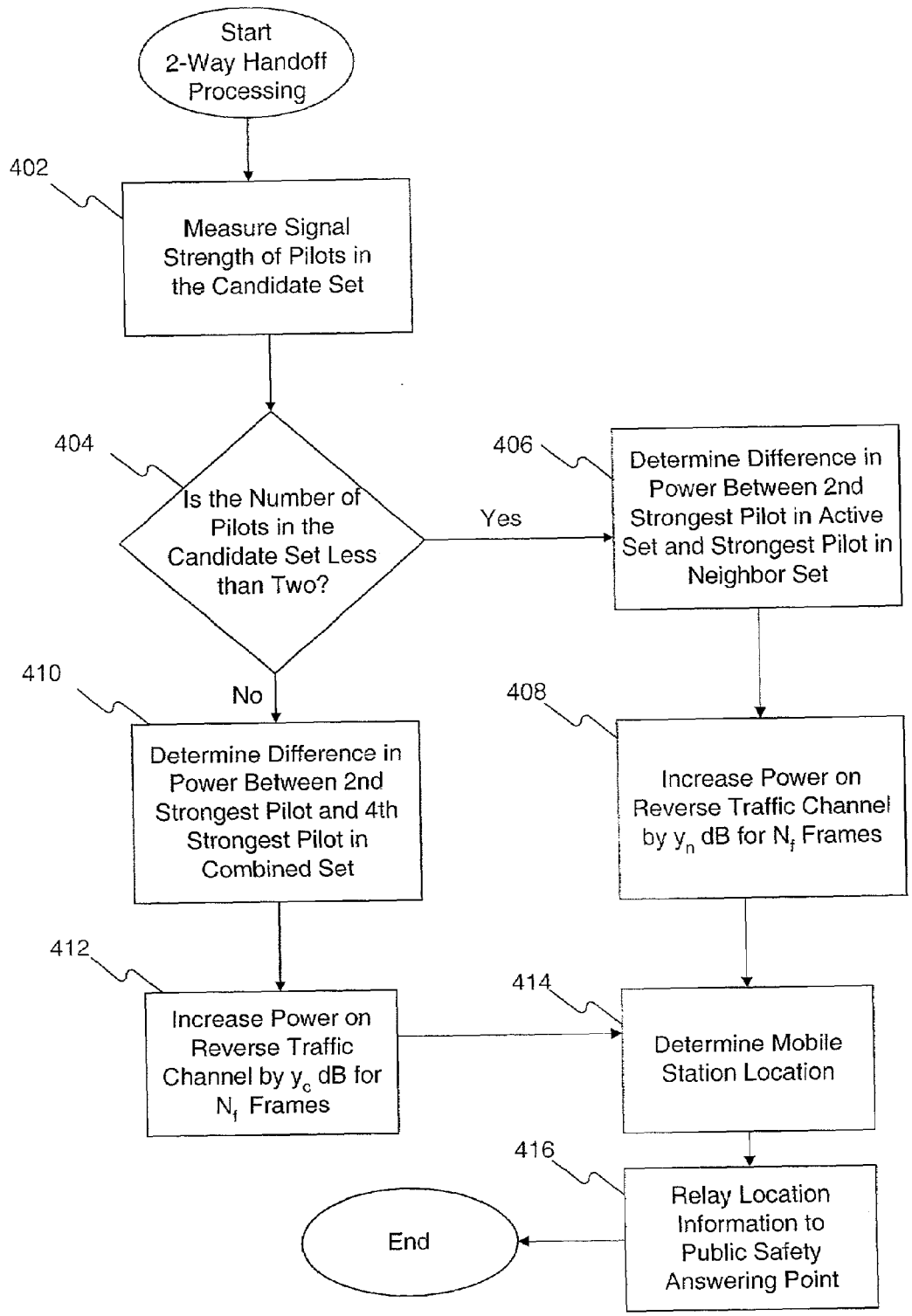
FIG. 4 is a diagram an exemplary flowchart of a method for mobile location detection during 2-way handoff in a manner consistent with the present invention.

FIG. 4 is an exemplary flowchart of a method for mobile location detection during 2-way handoff in a manner consistent with the present invention. Although the steps of the flow chart are described in a particular order, one skilled in the art will appreciate that these steps may be performed in a different order, or that some of these steps may be concurrent. First, the mobile station measures the signal strength of the pilots in the candidate set (step 402). Next, the mobile station determines whether the number of pilots in the candidate set is less than two (step 404).

If there are less than two pilots in the candidate set, then the mobile station determines the difference in power between the second strongest pilot in the active set and the strongest pilot in the neighbor set, and sets this difference as $y_n$ (step 406). Because this is the 2-way handoff case, there are two pilots in the active set. So another way to think of the second strongest pilot in the active set is as the weakest pilot in the active set. In response to a command from a base station, the mobile station increases power on the reverse traffic channel by $y_n$ dB for a predetermined number ($N_f$) of frames (step 408).

Once the power on the reverse traffic channel has been increased, position determining equipment 122 may determine the location of the mobile station (step 414). Thereafter, position determining equipment 122 relays location information to public safety answering point 126 via mobile positioning center 124 (step 416).

When there are two or more pilots in the candidate set, the mobile station determines the difference in power between the second strongest pilot and the fourth strongest pilot in the combined active and candidate sets, and sets this difference as $y_c$ (step 410). In other words, the mobile station determines the power difference between the weakest pilot in the active set and the second strongest pilot in the candidate set. In response to a command from a base station, the mobile station increases power on the reverse traffic channel by $y_c$ dB for a predetermined number ($N_f$) of frames (step 412).

Once the power on the reverse traffic channel has been increased, position determining equipment 122 may determine the location of the mobile station (step 414). Thereafter, position determining equipment 122 relays location information to public safety answering point 126 via mobile positioning center 124 (step 416).

Figure 5:
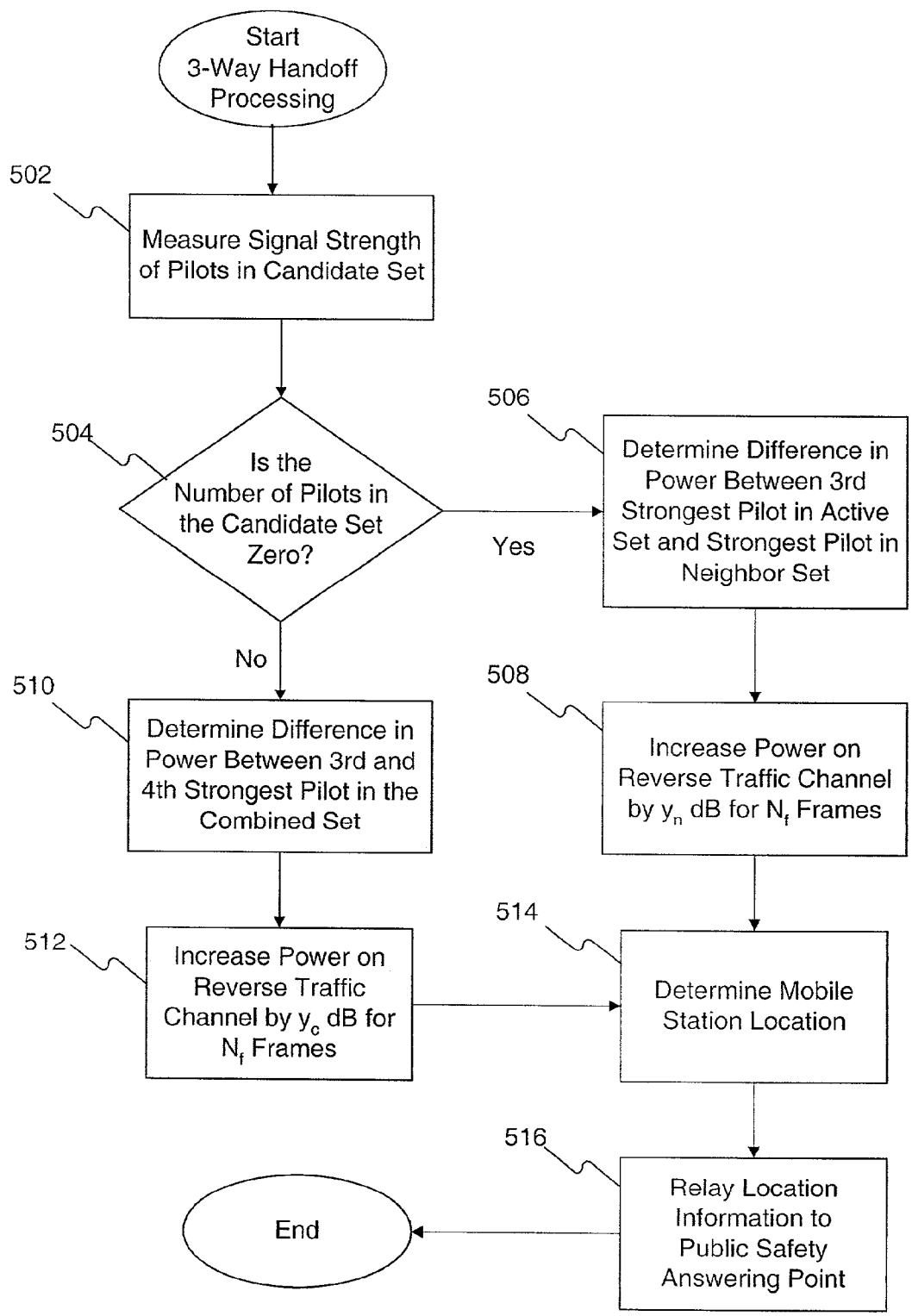
FIG. 5 is a diagram an exemplary flowchart of a method for mobile location detection during 3-way handoff in a manner consistent with the present invention.

FIG. 5 is an exemplary flowchart of a method for mobile location detection during 3-way handoff in a manner consistent with the present invention. Although the steps of the flow chart are described in a particular order, one skilled in the art will appreciate that these steps may be performed in a different order, or that some of these steps may be concurrent. First, the mobile station measures the signal strength of the pilots in the candidate set (step 502). Next, the mobile station determines whether the number of pilots in the candidate set is zero (step 504).

If there are no pilots in the candidate set, then the mobile station determines the difference in power between the third strongest pilot in the active set and the strongest pilot in the neighbor set, and sets this difference as $y_n$ (step 506). Because this is the 3-way handoff case, there are three pilots in the active set. So another way to think of the third strongest pilot in the active set is as the weakest pilot in the active set. In response to a command from a base station, the mobile station increases power on the reverse traffic channel by $y_n$ dB for a predetermined number ($N_f$) of frames (step 508).

Once the power on the reverse traffic channel has been increased, position determining equipment 122 may determine the location of the mobile station (step 514). Thereafter, position determining equipment 122 relays location information to public safety answering point 126 via mobile positioning center 124 (step 516).

When there are one or more pilots in the candidate set, the mobile station determines the difference in power between the third strongest pilot and the fourth strongest pilot in the combined active and candidate sets, and sets this difference as $y_c$ (step 506). In other words, the mobile station determines the power difference between the weakest pilot in the active set and the strongest pilot in the candidate set. In response to a command from a base station, the mobile station increases power on the reverse traffic channel by $y_c$ dB for a predetermined number ($N_f$) of frames (step 508).

Once the power on the reverse traffic channel has been increased, position determining equipment 122 may determine the location of the mobile station (step 510). Thereafter, position determining equipment 122 relays location information to public safety answering point 126 via mobile positioning center 124 (step 512).

While the present invention has been described in connection with various embodiments, many modifications will be readily apparent to those skilled in the art. Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave, optical signal or digital signal from a network, such as the Internet; or other forms of RAM or ROM either currently known or later developed. Additionally, although a number of the software components are described as being located on the same machine, one skilled in the art will appreciate that these components may be distributed over a number of machines. The invention, therefore, is not limited to the disclosure herein, but is intended to cover any adaptations or variations thereof.

What is claimed is:

1. A method for mobile station location detection, comprising:
    measuring signal strength of each of a set of signals associated with a mobile station and one or more base stations;
    determining whether a number of signals in the set is less than a predetermined threshold;
    calculating a difference in power between a first and second signal in the set based on the determination;
    increasing power on a channel corresponding to the mobile station in response to one or more power control messages from the one or more base stations, respectively, the power increase being based on the calculation and lasting for a predetermined number of frames, wherein the predetermined number of frames is a performance parameter set by a network administrator, network performance engineer or other user based on call setup time and duration of speech in one frame, and wherein a location of the mobile station is determined during the power increase; and
    preventing reduction in the power increase during the predetermined number of frames by programming the one or more base stations to stop issuing power control messages during the predetermined number of frames.

2. The method of claim 1, wherein the set of signals is a candidate set of pilot signals associated with the mobile station.

3. The method of claim 1, wherein the predetermined threshold varies dependent on a handoff status of the mobile station.

4. The method of claim 3, wherein the predetermined threshold is three when the mobile station is in a single handoff mode.

5. The method of claim 4, wherein the first signal is a strongest pilot signal in an active set of pilot signals associated with the mobile station, and the second signal is a second strongest pilot signal in a neighbor set of pilot signals associated with the mobile station.

6. The method of claim 4, wherein the first signal is a strongest pilot signal in an active set of pilot signals associated with the mobile station, and the second signal is a strongest pilot signal in a neighbor set of pilot signals associated with the mobile station.

7. The method of claim 4, wherein the first signal is a strongest pilot signal and the second signal is the fourth strongest pilot signal in a combined set of pilot signals associated with the mobile station, the combined set of pilot signals including an active set of pilot signals and a candidate set of pilot signals.

8. The method of claim 3, wherein the predetermined threshold is two when the mobile station is in a two-way handoff mode.

9. The method of claim 8, wherein the first signal is a second strongest pilot signal in an active set of pilot signals associated with the mobile station, and the second signal is a strongest pilot signal in a neighbor set of pilot signals associated with the mobile station.

10. The method of claim 8, wherein the first signal is a second strongest pilot signal and the second signal is the fourth strongest pilot signal in a combined set of pilot signals associated with the mobile station, the combined set of pilot signals including an active set of pilot signals and a candidate set of pilot signals.

11. The method of claim 3, wherein the predetermined threshold is one when the mobile station is in a three-way handoff mode.

12. The method of claim 11, wherein the first signal is a third strongest pilot signal and the second signal is the fourth strongest pilot signal in a combined set of pilot signals associated with the mobile station, the combined set of pilot signals including an active set of pilot signals and a candidate set of pilot signals.

13. The method of claim 1, wherein the predetermined number of frames is a number such that a base station does not have enough time to command a power decrease on the channel before the predetermined number of frames has elapsed.

14. The method of claim 1, wherein the channel is a reverse traffic channel.

15. The method of claim 1, wherein the power increase is greater when the number of signals in the set is less than the predetermined threshold than the power increase when the number of signals in the set is greater than or equal to the predetermined threshold.

16. A method for mobile station location detection, comprising:
    initiating an emergency services call from a mobile station to one or more base stations;
    measuring signal strength of each of a set of signals associated with the call;
    determining whether a number of signals in the set is less than a predetermined threshold based on a handoff status of the mobile station;

calculating a difference in power between a first and second signal in the set based on the determination;

increasing power on a channel corresponding to the mobile station in response to one or more power control messages from the one or more base stations, respectively, the power increase being based on the calculation and lasting for a predetermined number of frames, wherein the predetermined number of frames is a performance parameter set by a network administrator, network performance engineer or other user based on call setup time and duration of speech in one frame, and wherein a location of the mobile station is determined during the power increase; and preventing reduction in the power increase during the predetermined number of frames by programming the one or more base stations to stop issuing power control messages during the predetermined number of frames.

17. An apparatus for use in mobile station location detection, comprising:

means for measuring signal strength of each of a set of signals associated with a mobile station and one or more base stations;

means for determining whether a number of signals in the set is less than a predetermined threshold;

means for calculating a difference in power between a first and second signal in the set based on the determination;

means for increasing power on a channel corresponding to the mobile station in response to one or more power control messages from the one or more base stations, respectively, the power increase being based on the calculation for a predetermined number of frames, wherein the predetermined number of frames is a performance parameter set by a network administrator, network performance engineer or other user based on call setup time and duration of speech in one frame, and wherein a location of the mobile station is determined during the power increase; and preventing reduction in the power increase during the predetermined number of frames by programming the one or more base stations to stop issuing power control messages during the predetermined number of frames.

18. The apparatus of claim 17, wherein the set of signals is a candidate set of pilot signals associated with the mobile station.

19. The apparatus of claim 17, wherein the predetermined threshold varies dependent on a handoff status of the mobile station.

20. The apparatus of claim 19, wherein the predetermined threshold is three when the mobile station is in a single handoff mode.

21. The apparatus of claim 20, wherein the first signal is a strongest pilot signal in an active set of pilot signals associated with the mobile station, and the second signal is a second strongest pilot signal in a neighbor set of pilot signals associated with the mobile station.

22. The apparatus of claim 20, wherein the first signal is a strongest pilot signal in an active set of pilot signals associated with the mobile station, and the second signal is a strongest pilot signal in a neighbor set of pilot signals associated with the mobile station.

23. The apparatus of claim 20, wherein the first signal is a strongest pilot signal and the second signal is the fourth strongest pilot signal in a combined set of pilot signals associated with the mobile station, the combined set of pilot signals including an active set of pilot signals and a candidate set of pilot signals.

24. The apparatus of claim 19, wherein the predetermined threshold is two when the mobile station is in a two-way handoff mode.

25. The apparatus of claim 24, wherein the first signal is a second strongest pilot signal in an active set of pilot signals associated with the mobile station, and the second signal is a strongest pilot signal in a neighbor set of pilot signals associated with the mobile station.

26. The apparatus of claim 24, wherein the first signal is a second strongest pilot signal and the second signal is the fourth strongest pilot signal in a combined set of pilot signals associated with the mobile station, the combined set of pilot signals including an active set of pilot signals and a candidate set of pilot signals.

27. The apparatus of claim 19, wherein the predetermined threshold is one when the mobile station is in a three-way handoff mode.

28. The apparatus of claim 27, wherein the first signal is a third strongest pilot signal and the second signal is the fourth strongest pilot signal in a combined set of pilot signals associated with the mobile station, the combined set of pilot signals including an active set of pilot signals and a candidate set of pilot signals.

29. The apparatus of claim 17, wherein the predetermined number of frames is a number such that a base station does not have enough time to command a power decrease on the channel before the predetermined number of frames has elapsed.

30. The apparatus of claim 17, wherein the channel is a reverse traffic channel.

31. The apparatus of claim 17, wherein the power increase is greater when the number of signals in the set is less than the predetermined threshold than the power increase when the number of signals in the set is greater than or equal to the predetermined threshold.

32. An apparatus for use in mobile station location detection, comprising:

means for initiating an emergency services call from a mobile station to one or more base stations;

means for measuring signal strength of each of a set of signals associated with the call;

means for determining whether a number of signals in the set is less than a predetermined threshold based on a handoff status of the mobile station;

means for calculating a difference in power between a first and second signal in the set based on the determination;

means for increasing power on a channel corresponding to the mobile station in response to one or more power control messages from the one or more base stations, respectively, the power increase being based on the calculation and lasting for a predetermined number of frames, wherein the predetermined number of frames is a performance parameter set by a network administrator, network performance engineer or other user based on call setup time and duration of speech in one frame, and wherein a location of the mobile station is determined during the power increase; and preventing reduction in the power increase during the predetermined number of frames by programming the one or more base stations to stop issuing power control messages during the predetermined number of frames.

33. A method for mobile station location detection, comprising:

initiating a call from a mobile station to one or more base stations;

measuring signal strength of each of a set of signals associated with the call;

determining whether a number of signals in the set is less than a predetermined threshold based on a handoff status of the mobile station;

calculating a difference in power between a first and second signal in the set based on the determination;

increasing power on a channel corresponding to the mobile station in response to one or more power control messages from the one or more base stations, respectively, the power increase being based on the calculation and lasting for a predetermined number of frames wherein the predetermined number of frames is a performance parameter set by a network administrator, network performance engineer or other user based on call setup time and duration of speech in one frame;

preventing reduction in the power increase during the predetermined number of frames by programming the one or more base stations to stop issuing power control messages during the predetermined number of frames; and determining, during the power increase, a location of the mobile station using a technique based on a difference in arrival time of a signal from the mobile station at separate ones of the base stations.

* * * * *